UNITED STATES PATENT OFFICE.

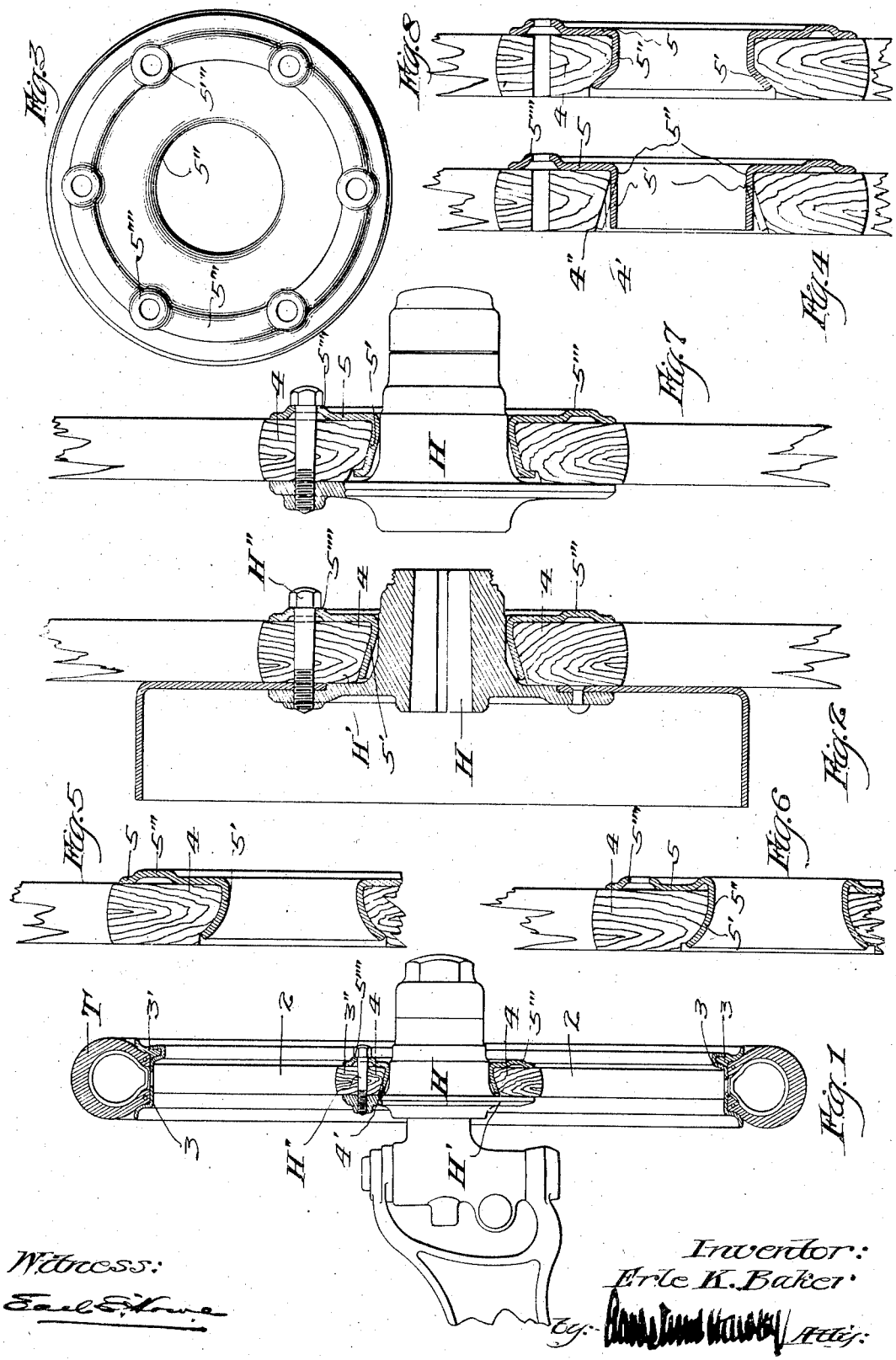

ERLE KING BAKER, OF CHICAGO, ILLINOIS, ASSIGNOR TO BAKER WHEEL & RIM COMPANY, OF CHICAGO, ILLINOIS, A CORPORATION OF ILLINOIS.

WHEEL FOR AUTOMOBILES.

1,399,720.   Specification of Letters Patent.   Patented Dec. 6, 1921.

Application filed August 20, 1921. Serial No. 493,775.

*To all whom it may concern:*

Be it known that I, ERLE KING BAKER, a citizen of the United States, and a resident of Chicago, county of Cook, and State of Illinois, have invented certain new and useful Improvements in and for Wheels for Automobiles, of which the following is a specification.

My invention relates to improvements in motor wheels of the class having spokes which are mitered at their inner ends and assembled to form a wooden hub center. Such spokes are not slipped into the hub, but are made in such form that the completely assembled wheel may be placed on a suitable metal hub and secured thereto between hub flanges.

The invention is an improvement upon and subsidiary to that described and claimed in our co-pending application, Serial No. 357,440, filed February 9, 1920.

In manufacturing and assembling wooden wheels, the wheels are made up without being fitted to the permanent hubs, and in the handling and shipping of such wheels the spoke butts at the hubs, which are usually held against transverse movement only by frictional engagement with one another, are often jarred and loosened or become somewhat warped. This loosening of the hub center of the wheel greatly lessens the strength, and consequently the commercial value thereof.

It is the object of my invention to provide a wheel center construction which will make impossible any individual spoke movement after the wheel is once made up, and to greatly increase the strength and commercial value of the wheel.

The general nature and details of my invention will be readily understood on reference to the accompanying drawings, which illustrate the demountable wheel, and wherein:

Figure 1 is a sectional view of an automobile wheel embodying my invention, mounted upon an automobile front wheel hub;—Fig. 2 is an enlarged section of the central portion of the same wheel mounted upon an automobile rear hub which bears the brake drum;—Fig. 3 is a face view of the hub-center ring or member, taken from Fig. 2;—Fig. 4 illustrates the method which I follow in applying the centering members to my wheels;—Figs. 5, 6, 7, and 8 are sectional views illustrating modified forms of the wheel centering member.

The particular wheel shown in Fig. 1 comprises the radial wooden spokes, 2, and the fixed rim, 3, the latter being an endless ring of metal having one integral flange and one detachable side flange 3', 3', and adapted to receive the pneumatic tire T. This wheel is further characterized by the hub center, 3'', which comprises spoke butts, 4, which are compressed and firmly seated one against the other. Wheels of the general character described are, after assembly, centrally bored to form a hub-hole. In the application of my invention to such wheels, the portion of the hub center, adjacent the hub-hole, is beveled or tapered at 4', on the inner side, for the purpose to be hereinafter described.

Such wheels are mounted upon automobile hubs, H, which are characterized by fixed back flanges, H', and are secured thereto by means of a plurality of hub bolts, H''.

Commonly every hub is provided with a detachable flange which, in use, engages the outer side of the wheel. I entirely dispense with such detachable or outer hub flange and construct my wheels in such manner as to make them unnecessary; and in doing so I employ means like unto that described in aforesaid application, Ser. No. 357,440 for permanently interlocking the spoke butts of the wheel, and provide the hub hole of the wheel with a metal facing adapted for rockable contact with the vehicle hub, H.

As will be seen from the drawings, each of my wheels is characterized by a central metal member comprising a flange-like portion, 5, and a ring-like portion, 5', in one piece.

As before stated, the hole, 4, is flared or beveled toward the inner side of the wheel. Initially the portion, 5', is substantially perpendicular to the portion 5, as shown in full lines in Fig. 4. In that condition the portion 5 is small enough to enter the hole, 4', within the wooden center of the wheel. After being so positioned, the portion, 5', is expanded, as shown by dotted lines in Fig. 4, and thereby the whole device 5—5' is frictionally clamped upon the spoke butts.

The opening 5'' within the metal part is of a size to snugly fit the barrel of the metal hub and to be in substantially single-line contact therewith; that is, in an easily rockable engagement or contact which facilitates placing the wheel on the hub and taking it therefrom. This valuable effect may be attained or approximated through the employment of any of the several forms detailed in Figs. 3 to 8, which serve to illustrate that my invention is not limited to the preferred form of the structure detailed in Fig. 2.

Any manner or fashion of expanding the tubular portion, 5', and clinching it upon the spokes may be employed.

In every case it will be observed that the tubular portion, 5', of the center reinforcing member stops short of the back face 4" of the wheel center portion, whereby the inner face of the wooden hub center of the wheel is made certain to squarely engage the metal back flange, H', of the hub. The hub bolts, as shown, pass through the portion 5, thence through holes in the hub center of the wheel and thence into threaded openings in the back flange of the hub. Under this arrangement a strong frictional engagement is set up between the wooden hub center of the wheel and the metal hub.

The hub-centering and reinforcing member, 5, 5', performs all the functions of the usual front flange, and more; and there is no danger of its being separated or lost.

By preference I make the member, 5, 5', of sheet metal, by a stamping process. The material employed need not be heavy, and for the sake of reinforcing the portion, 5, and providing seats for the heads of the bolts, H", I stamp or form the member with a raised rib 5''', best shown in Fig. 3. The portions, 5'''', directly beneath the bolt heads, may be raised slightly above the intermediate portions of the rib.

I thus provide a wheel which is absolutely complete and reliably stable within itself, and one in which I preserve the desirable wood-to-metal frictional contact between the wheel and the metal hub; and in which the compressibility and resilience of the wood hub center of the wheel is preserved for the purpose of locking the hub bolts when the latter have been screwed tightly in place.

A wheel constructed in this manner is essentially climate-proof, and will not become loose or warped however long it may be carried or stored as a "spare" wheel while not used or clamped upon the hub.

Having thus described my invention, I claim as new and desire to secure by Letters Patent:

1. A wheel having a complement of wooden spokes, the butts of which form the hub-center of the wheel, in combination with a metallic centering and reinforcing member comprising an outer facing flange 5 and an expanded tubular portion, 5', between which portions the ends of the spoke butts are clamped.

2. A wheel having a complement of wooden spokes, the butts of which form the hub-center of the wheel, in combination with a metallic centering and reinforcing member comprising an outer facing flange 5 and an expanded tubular portion, 5', between which portions the ends of the spoke butts are clamped and said tubular portion being of less length or width than the thickness of the spokes.

3. A wheel center member, comprising a tubular portion 5' adapted to be expanded at the inner end, and a facing flange portion 5, adapted to engage the outer face of a wooden hub center.

4. A wheel center member, comprising a tubular portion 5' adapted to be expanded at the inner end, and a facing flange portion 5, adapted to engage the outer face of a wooden hub center, and provided with a reinforcing rib 5" containing the hub bolt holes.

In testimony whereof, I have hereunto set my hand this 18th day of August, 1921.

ERLE KING BAKER.